United States Patent [19]
Leitz, Jr.

[11] 3,883,383
[45] May 13, 1975

[54] METHOD OF FABRICATING EMBOSSED MEMBRANES

[75] Inventor: Frank B. Leitz, Jr., Weston, Mass.

[73] Assignee: Ionics, Incorporated, Watertown, Mass.

[22] Filed: Sept. 21, 1966

[21] Appl. No.: 580,914

[52] U.S. Cl. ............... 156/242; 156/247; 156/290; 156/292
[51] Int. Cl. ............................................ B29c 19/00
[58] Field of Search ................... 156/245–247, 156/209, 219, 220, 242, 290, 292; 264/284, 293, 313, 316, 214

[56] References Cited
UNITED STATES PATENTS

| | | | |
|---|---|---|---|
| 3,069,728 | 12/1962 | Mindick et al. | 156/246 X |
| 3,305,618 | 2/1967 | Sucher et al. | 264/313 X |
| 3,311,692 | 3/1967 | Baird | 264/284 X |

*Primary Examiner*—Stephen J. Lechert, Jr.
*Attorney, Agent, or Firm*—Norman E. Saliba

[57] ABSTRACT

This invention is directed to the fabrication of embossed ion-exchange membranes. The procedural steps include the making of such membranes by the insertion of such component parts as bottom and top sheets of plate glass having therebetween liquid ion exchange monomers, porous sheets of membrane reinforcing materials and patterned flexible metal plate molds. After heat polymerization of the monomers, the mold is peeled off to produce the embossed ion exchange membrane. There is also disclosed a modified procedure for producing ion-exchange membranes with both surfaces embossed.

12 Claims, 4 Drawing Figures

INVENTOR
FRANK B. LEITZ

BY,

ATTORNEY

METHOD OF FABRICATING EMBOSSED MEMBRANES

This invention relates to improvements in the fabrication of embossed membranes for use in electrodialysis systems employing the same wherein transfer of ions through fluid-confining membrane walls is caused by the ionic character of said membranes. More particularly, the present invention is directed to a novel method of making ion exchange membranes having partly raised surfaces or projections on the membrane surface or surfaces therefore to effect a more efficient use in the demineralization of fluids to a very low level. For purposes of this disclosure, fluids is defined as a liquid, gas or vapor.

Ion exchange membranes, both anion and cation, and their use in electrodialysis systems to deionize aqueous solutions are well known and fully described, for example, in Pat. Nos. Re. 24,865; 2,730,768, etc. More specifically, ion exchange membranes are comprised of solvated ionexchange resins generally in sheet form which are usually reinforced and supported by inert woven fabric materials. Such membranes generally comprise about 30 percent fabric be weight, 40 percent resin, and about 30 percent solvent, the latter being uniformly dispersed throughout the resin. Cation membranes are composed typically of cross-linked sulfonated polymers of styrene-divinylbenzene in the presence of an imbibed solvent such as diethylbenzene, the latter organic solvent being converted ito an aqueous solvent when the membrane is equilibrated in an aqueous medium. Typical anion membranes may be cross-linked styrene-divinylbenzene-solvent structures with quaternary ammonium salt groups attached thereto. Such coherent, homogenous and smooth surface structures are generally made by casting or molding of thermosetting or thermoplastic resins between flat sheets of glass and most often with supporting resin impregnated backing materials such as Saran (a generic name for manufactured fiber in which the fiber-forming substance is any long-chain synthetic polymer composed of at least 80% by weight of vinylidene chloride units), Dynel (modacrylics), nylon (polyamides) glass cloth and similar materials resistant to strong acids. Such membranes when employed in multicell electrodialysis systems are usually but not always spaced in alternate anion and cation exchange order between which are spacers of non-conducting plastic sheets with cut-out portions therein which form the flow path of aqueous liquids to be demineralized. This is also common practice as noted in U.S. Pat. No. 2,826,544, issued Mar. 11, 1958. However it was found that when the aqueous solutions or gases passing through the flow-paths of the spacers become low in ionic content, polarization results with accompanying energy-consuming high resistivity to the flow of the electric current passing through the fluid containing compartments. In the case of electrochemical atmospheric regeneration employing a "$CO_2$scrubber" to remove carbon dioxide from cabin air, the electrical conductance of the flowing fluid is essentially zero and accordingly an alternative conduction path is needed. This invention has particular application to the treatment by electrodialysis, of fluids of low conductivity including gases as well as aqeous or non-aqueous solutions.

The prior art has recognized the problem involved in the situation where the fluid to be demineralized by electrodialysis often has a low conductivity whereas the electrical path itselt should be higly conductive. To overcome this problem ion-exchange bead-packing and screen-packing were suggested. However, it was found that packing the compartments with ion-conducting beads is extremely difficult in the laboratory while reassembly in the field is virtually impossible. The screen, which usually consists of open weave plastic mesh into which an ion-conducting material has been imbibed, did not prove to be stable in use.

The disadvantages of the use of the above flat, smooth, surface ion exchange membranes for the electrodialysis of solutions of low conductivity were found to be overcome by the use of raised membrane surfaces or projections termed embossed membranes as described hereinafter, which projections comprise most or all of the ion-conducting path through the low-conductivity medium.

The prior art has attempted to fabricate embossed ion-exchange membranes by molding or casting the same with preshaped glass molds. This method was proven unsatisfactory for many reasons including the lack of flexibility of the glass; only a very limited number of designed patterns could be made; the glass after use was most difficult to clean for reuse; the glass was brittle and often cracked or broke altogether; the designs on pieces of glass were expensive to stamp out; the glass often stuck tenaciously to the membrane material; and glass generally proved unsatisfactory.

The present novel procedure for making embossed membrane using flexible or pliable metal foils, such as aluminum foil in place of glass, offers increased simplicity of production, dependable methods of membrane casting, greater availability of patterns, and far more economical advantages for the production of embossed ion-exchange membranes.

This invention provides a new and novel method of effecting protuberances on membrane for carrying out electrodialysis on an economic basis. More particularly, the invention provides improvements in the deionizing of low conductivity solutions effecting long operational life, low pressure drop in the electrodialysis compartments, and generally improved performance of the entire electrodialysis stack. In addition the present embossed membranes have proved far superior in performance to the heretofore use in ion-exchange beads or screens.

Accordingly, the present invention is more specifically directed to a new fabrication technique involving a metal pattern plate for forming, by molding or casting, embossed ion-exchange membranes for use in electrodialysis systems.

The aforementioned and various other aims, objects and advantages of the invention will appear more fully from the detailed description which follows, accompanied by the drawings, showing, for the purpose of illustration, the preferred method for practicing the invention.

Although the characteristic process steps of this invention which are believed to be novel will be particularly pointed out in the claims appended hereto, the invention itself, its object and advantages, and the manner in which it may be carried out will be understood by referring to the following descriptions taken in connection with the accompanying drawings in which:

In the following description and in the claims various details will be referred to in specific form but it should be understood that these are merely generic in their application as the art will permit. For example, the Teflon tetrafluoroethylene masking material could be any other equivalent material which effects prevention of sticking of the parts when the embossed membranes are removed from the tray. The Teflon masks which are more expensive than aluminum foil plates recommended reusable, whereby a flat area for gasketing is produced by leaving an unpatterned margin around the metal plate. The embossed aluminum cast plate may take various and sundry forms and shapes and, in addition, while preferred in the present case it is nevertheless to be understood that other soft type, flexible and self-protecting surface metals, retaining a clean surface for repeated use, could be used. Such metals include the electrolytic valve metal for example columbium, as well as the noble metals, the latter obviously being to expensive for normal use herein. The metal plate, preferably aluminum, is generally reusable but limited nevertheless to up to about 10 polymerizations. However, these plates are inexpensive and ordinarily may be cleaned after use with a common laboratory detergent and thoroughly dried before reuse. Nevertheless, once the polymer begins to adhere to a particular spot on the aluminum plate, all future casts are almost certain to adhere to that particular spot and a corresponding deformed embossed membrane would result. New plates are recommonded after several cast polymerizations have taken place with its use. The ion-exchange monomers may be of anion or cation exchange types, with or without the functional ion-exchange groups attached thereto. Accordingly, it is understood that the details may be modified in various aspects without departing from the principles of the invention and that the invention may be applied to other designed embossed membranes than the one shown hereinafter.

Figure 1:
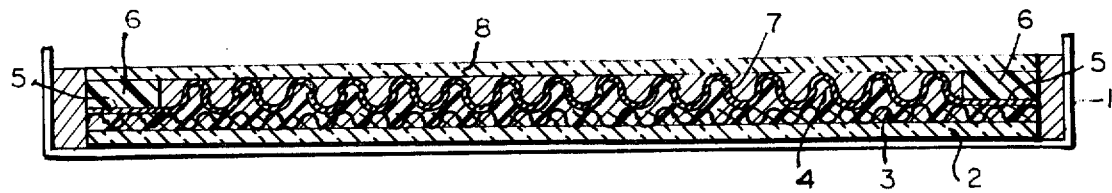
FIG. 1 is a cross-sectional view of a polymerization tray containing the elements involved in a process of making one type of the embossed ion-exchange membranes of the invention.

The polymerization open tray 1 of FIG. 1 is of a predetermined size in accordance with the dimensions of te membranes desired as, for example, 10 × 20, 18 × 36, etc. and of a depth depending on how many embossed membranes are to be produced in the tray. The membrane may be thin or thick as desired but normally have a thickness of from about 1 to about 100 mils. The tray itself may be Teflon-coated by spraying or painting the whole inside surface for easy removal of the contents thereof. The broad procedure for making one type of the embossed ion-exchange membranes of the invention may be described as follows taken in connection with FIG. 1;

Plates glass 2 of about ⅛ to 3/32 inches in thickness is first placed on the bottom of tray 1 which covers substantially the entire base thereof. The liquid monomers of the ion-exchange resin materials 4 may then be poured into the tray to generously cover the inserted glass plate. This may be of a depth, for example, of about one-half inch above the inserted glass plate. The monomers may be, for example, preset proper proportions of styrene-divinyl-benzene with diethylbenzene as the solvent therefor with or without the active functional ion-exchange groups (whether anionic or cationic in character) attached thereto. In the event the active ion-exchange groups are not present at this stage of the process, they may be attached in a manner well known in the art after the membranes are removed as polymerized embossed membrane boards. The next step involves the insertion of the backing material 3 into the tray which distributes itself into the liquid monomers as far down as the surface of the glass plate at the bottom layer of the tray. The backing material is a supporting reinforcing web such as 20 mil Dynel, open weave glass cloth and many other similar materials having the approximate thickness of th marginal area thickness of the membrane to be made. It is to be understood that the monomers could be added to the polymerizing tray before or after the backing material is placed on the bottom glass plate, or even before the glass plate is inserted in the tray since the liquid monomers would settle on, around and above the glass plate and backing material in any event.

An aluminum foil plate 7 of about 5 mils thickness which has been preshaped to the pattern desired in a solid brass or aluminum die and to have up to 100 mils pattern heights is provided with a flat marginal area 5 for gasketing use when the formed embossed membrane is placed in a stack of an electrodialysis cell. The aluminum plate 7 is then inserted in the tray which settles to the area of the bottom plate glass 2 surrounded by the resin monomers having the backing material therein. Thereafter Teflon 6 or other sticking-preventing material is inserted in the tray which is sized to cover only the flat, unpatterened marginal areas of the shaped aluminum foil. The thickness of the masking Teflon which borders the marginal area of the inserted aliminum plate is determined by the net verticle pattern height of said patterned aluminum plate. Parallel rib patterns are preferred. The height of the rib projections may vary within wide limits but an extension of about 30 mils in a direction perpendicular to the flat surface of the membrane would be satisfactory. Such a membrane having a 30 mil thickness across the flat marginal area would then have a total central area thickness of about 60 mils. Such a pattern would include interrupted ribs of about 7.5 ribs per inch parallel to the net flow direction which has been found to have desirable performance characteristics in a $CO_2$ scrubber.

Finally, another plate glass 8, similar to the one placed on initially at the bottom of the tray, is then inserted which rests on the entire lenght of the Teflon mask 6 and over the tops of the row of solid patterened ribs of aluminum plate 7. It will be apparent that a series of similar combinations of steps may be repeated to produce a series of duplicated embossed ion-exchange membranes in a single tray of proper depth. Such trays are often of such depth as to make as many as 20 or 30 ion-exchange membranes in a single batch.

The tray as now constituted is placed in a polymerization oven and kept at elevated temperatures for a period of many hours (overnight) which is usual practice in the art for polymerization of monomer combinations. The tray is then removed from the oven, the entire contents of the tray removed therefrom, the top sheet of glass pryed off, the Teflon mask removed and, finally, the aluminum plate is removed by stripping or peeling the same off the embossed surface of the solid membrane 4.

With respect to the patterned aluminum foil plate, care should be taken when placing the same in the monomer bath to prevent air bubbles from lodgment within the embossment of the metal foil to prevent misshaped projections in the formed membrane. In addition, it is most cirtical that the removal of the flexible metal foil plate be effected by peeling or stripping off the metal plate from the polymerized ion-exchange membrane; otherwise, the molded ion-exchange membrane may be scratched, torn, broken, or mutilated in the process of removing said plate. The peeling of the aluminum foil from the membrane was found to be most successful in obtaining an undamaged embossed membrane product. The metal foil plate, if not damaged, may be reused many times and, since it is far less costly than the ion-exchange membrane, the protection of the embossed membrane is of first consideration in dismantling the polymerized assembly. It will be found that the top and bottom plate glass, the Teflon mask, and the patterned aluminum foil are easily removed leaving the polymerized preshaped embossed membrane for its intended use in electrodialysis cell systems.

Figure 2:
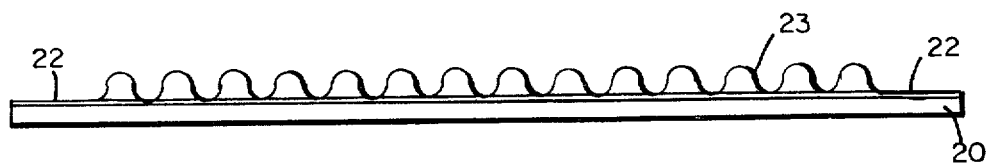
FIG. 2 is a cross-sectional view of the completed embossed membrane when removed from the polymerization tray of FIG. 1.

FIG. 2 shows a cross-sectional view of the ion-exchange membrane as the product of the process outlined in the tray of FIG. 1, wherein membrane 20 has the embossments 23 situated on one side of the surface of said membrane. The flat marginal area 22 extends around the periphery of the membrane up to the base of projections 23. When arranged in an electrolytic stack the tips of the projection contact the flat surface of the adjacent membrane whereby direct electric contact is formed as a bridge between end electrodes (not shown). The flow of fluid to be demineralized is effected through the troughs of projections 23 and demineralized at most economical consumption of electrical energy.

Figure 3:
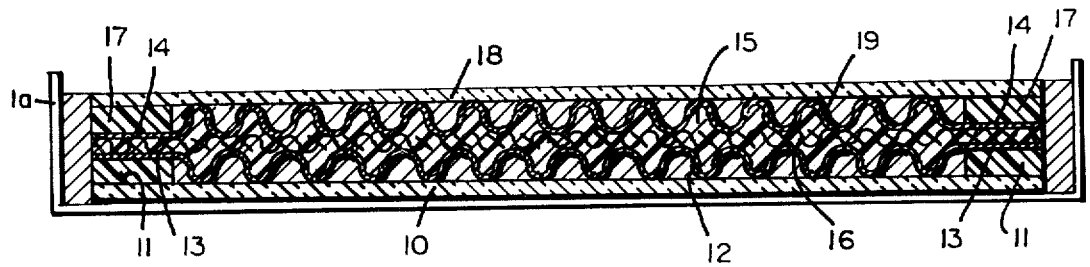
FIG. 3 is a modified polymerization tray containing all the elements involved in the process of making a modified type of ion-exchange membranes with both surfaces embossed.

While it will be noted that the pattern of the ion-exchanger membrane made by the procedure above described is embossed on only one side of the membrane, such embossments may be situated on both sides which is effected in accordance with the following fabrication taken in connection with the modified tray assembly as shown in FIG. 3 wherein the casting is made between two aluminum plates in reversed position to each other.

Into the open tray 1a of FIG. 3 there is inserted a flat plate of glass 10 similar to that shown in FIG. 1. The Teflon mask 11 is placed on the glass sheet. The preshaped aluminum plate 12 is placed on the bottom plate glass in reverse direction as that noted in the tray of FIG. 1; namey, the flat marginal area 13 extending around the embossed membrane area of the aluminum foil plate 12 is supported by the sticking-preventative Teflon mask 11 which is of the same thickness as the verticle height of the projections (embossments) of the preshaped aluminum foil. This allows the entire length of the aluminum plate 12 to be supported by the bottom glass plate 10. The mash backing material 16 is then inserted into the tray 1a to rest upon the patterned aluminum foil plate 12 and the Teflon mask 11. Liquid monomers are poured into the tray to a predetermined height and a second similar patterned aluminum foil plate 19, in reverse direction to the bottom aluminum foil plate 12, is inserted into the tray with its flat marginal area 14 resting upon the backing material 16. Teflon masking 17 of the thickness of the verticle height of the upward projections of the aluminum foil plate 19 is inserted upon flat, marginal area 14 of said foil plate, and another glass plate 19 similar to the bottom glass plate 10 is inserted into the tray to rest upon the Teflon mask 17 and the tops of the embossments of aluminum foil plate 19. Following the same sequence a number of similar membranes can be laid in the same tray. The tray is then heated in an oven for a predetermined time and temperature to polymerize the liquid monomers. After removing the assembly from the oven, the double-faced embossed membrane 15 is recovered in similar manner as described in connection with the membrane prepared in the tray of FIG. 1, it being appreciated that both patterned metal foil plates of FIG. 3 are removed from the embossed-shaped ion-exchange membrane 15 by peeling or stripping of the metal plates from said membrane. All other methods than the one described for removing the patterned metal foil plates were proven unsatisfactory. By peeling or stripping is meant the grasping of one side edge of the flat marginal metal plate and carefully drawing off the metal plate in such a manner as one would peel or strip off a postage stamp or a bandage from a surface to which it is attached.

Figure 4:
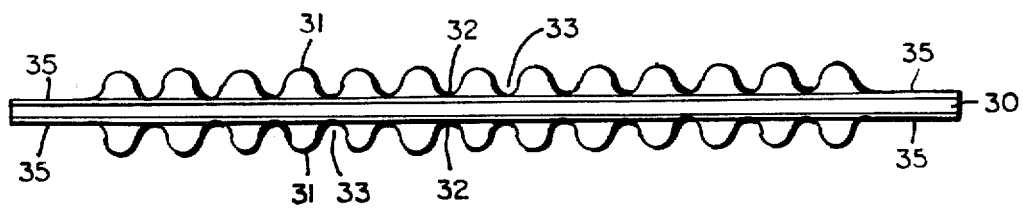
FIG. 4 is a cross-sectional view of an embossed ion-exchange membrane as produced and removed from the polymerization tray of FIG. 3.

The embossed ion-exchange membrane made by the process above in the tray of FIG. 3 takes the form of a corrugated ion-exchange membrane as shown in FIG. 4 wherein the homogeneous membrane 30 is shown to have substantially flat marginal sealing area 35. Other than the sealing areas both surfaces of the remaining area are embossed with a plurality of projections 31 and reducing portions 32. It will be apparent that the receding portions are so arranged as to form flow channels 33. It is also apparent that many and various geometric designs, such as ribs, studs, ridges and the like, may be provided on the surface or surfaces of the ion-exchange membranes.

When the elements comprising the electrolytic cell are assembled into a fluid-tight stack arrangement, the tips of the projecting portions of the membrane, whether embossed on one side only or two sides, would press against the flat surface or tips of each adjacent ion-exchange membrane which causes electical contact and forms a continuous ion-conducting bridge between the pair of end electrodes. This arrangement will allow an electric current to be carried between electrodes, primarily by mobile ions of one sign or the other, passing through the membrane structure.

It wil be apparent that the forms and shapes of embossed membranes may be designed almost without limit but the procedural steps for making the same as described hereinabove remains essentially the same.

What is claimed is:

1. The method of making an embossed ion-exchange membrane comprising:
   a. inserting a sheet of glass in a tray;
   b. inserting polymerizable ion-exchange resin monomers in said tray to a predetermined height;
   c. inserting a porous sheet of membrane-supporting backing material into said tray;

d. inserting a patterned sheet or plate of soft flexible metal into said tray, said sheet being provided with a flat marginal area;

e. inserting masking material on said flat marginal area;

f. inserting another glass sheet to rest on the surface of the masking material;

g. heating the tray and its contents for polymerization of the monomers therein;

h. and thereafter removing and separating the contents of the tray and peeling or stripping the said patterned sheet or plate from the resulting polymerized ion-exchange resin to obtain an embossed ion-exchange membrane.

2. The method of claim 1 wherein the order of steps (b) and (c) are reversed.

3. The method of claim 1 wherein the order of steps (a) and (b) are reversed.

4. The method of claim 1 wherein the metal plate is aluminum foil and the marginal area of the plate is a flat border frame from the base of the embossments forming the gasketing area in subsequent use in an electrodialysis cell.

5. The method of claim 1 wherein the metal plate is an electrolytic valve metal foil.

6. The method of cliam 4 wherein the metal plate is columbium.

7. The method of claim 1 wherein a masking material is placed on the flat marginal areas of the metal plate having a thickness substantially equal to that of the verticle heights of the embossments on said metal plate.

8. The method of claim 1 wherein the masking material is tetrafluoroethylene.

9. The method of claim 1 including the step of inserting a similar second patterned metal plate in reverse direction from the first metal plate and wherein a second tetrafluoroethylene mask is placed at the under side of the flat marginal areas of the said second patterned metal plate whereby the resulting ion-exchange membrane is embossed on both sides.

10. The method of claim 1 wherein the backing material is nylon.

11. The method of claim 1 wherein the backing material is an open weave glass cloth.

12. The method of claim 1 wherein a plurality of embossed ion-exchange membranes are made in a single tray by sequentially repeating the steps of said claim 1 and wherein the filled tray is placed in an oven at elevated temperatures for polymerizing said monomers in the layers between the plurality of glass plates.

* * * * *